Figure 1:
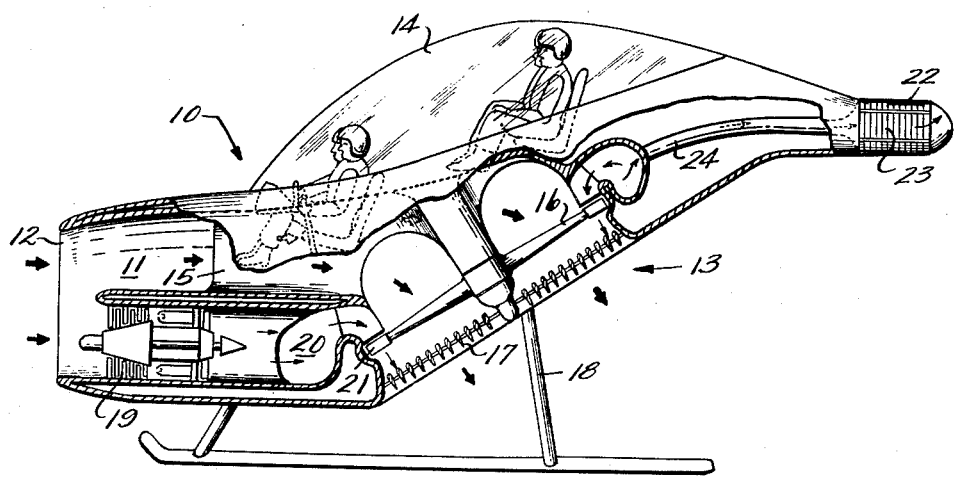

April 12, 1960  P. G. KAPPUS  2,932,468
VTOL AIRCRAFT
Filed Dec. 6, 1957

INVENTOR.
PETER G. KAPPUS
BY John F. Cullen
ATTORNEY

United States Patent Office 2,932,468
Patented Apr. 12, 1960

2,932,468

VTOL AIRCRAFT

Peter Gottfried Kappus, Cincinnati, Ohio, assignor to General Electric Company, a corporation of New York Application December 6, 1957, Serial No. 701,017

5 Claims. (Cl. 244—23)

The present invention relates to a VTOL aircraft and, more particularly, to a combination of a novel propulsion system with such aircraft, which is capable of propelling the aircraft in normal fashion at high speed, and is also capable of providing vertical lift to permit vertical take-off.

The VTOL, or vertical take-off and landing aircraft, as such, is not new. Many types have been proposed over the years, and are still being proposed, and some have been successful. More recently, with the advent of the jet engine, VTOL aircraft employing jet engines have been studied and produced. The advantage of the VTOL aircraft is obvious since it dispenses with the long runways and permits a much more maneuverable craft. Some proposals have disclosed aircraft in which the jet engines are rotatable within the wings, so that they may exhaust directly downwardly for vertical lift, and then be rotated into a horizontal position for normal flight. Generally speaking, to applicant's knowledge, these kinds of aircraft have not been very successful due to the very high fuel consumption in hovering flight. In addition, VTOL aircraft employing large fans have been proposed. These fans move a large quantity of air to provide a maximum thrust but are relatively slow moving in the forward direction. An aircraft is desired which is able to take off in the vertical direction, hover, and move forward at high speeds. Such aircraft normally require such large fans that they leave little or no room for carrying a pay load which may be freight or passengers. It is also desirable to have such an aircraft which, preferably, does not employ wings, since these merely add to the bulk and weight of the aircraft. If the lift and stability contributed by the wings can be provided without wings, a contribution is thus made. Such a wingless aircraft, however, is inherently unstable and requires an arrangement that is straightforward, simple, and controllable, as will be apparent in the instant invention, if it is to be feasible. Devices of these types, which have thus far been perfected, have been either propeller operated or, in those employing jet engines, have been limited by very short flight duration time and relatively low forward speeds at a high fuel consumption rate.

It is a primary object of the present invention to provide a VTOL aircraft which uses a single fan or fans to provide motive power for all attitudes of flight.

A further object is to provide such an aircraft which, by its arrangement, provides a relatively large load-carrying platform by taking the fan air into a forwardly directed inlet to permit an obstructed top surface.

Another object of the invention is to provide a VTOL aircraft which is easily controllable and is designed to permit vertical lift, hovering, and rapid forward speed.

Briefly stated, I provide a VTOL aircraft which has a substantially straight-through air duct and a fan mounted in the air duct at an angle to the vertical. The fan exhausts rearwardly and downwardly of the aircraft. Gas generating means are provided in the air duct to operate a tip turbine on the fan to drive the fan and then exhaust in the fan's stream. A reaction control is provided at the aft end of the aircraft to use some of the generated gas for attitude control. The arrangement permits a large load-carrying platform directly above the fan and inlet ducting, which load-carrying platform is completely free of any obstacles normally presented by the use of fans.

My invention will be better understood from the following description taken in connection with the accompanying drawing, and its scope will be pointed out in the appended claims.

Figure 2:
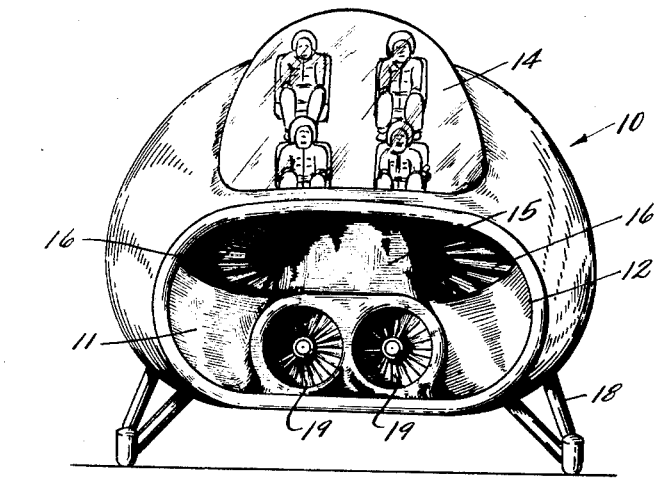

In the drawing:

Figure 1 is a plan view, partially in cross section, of the novel arrangement of the VTOL aircraft as it would appear in flight or on the ground, and, Figure 2 is a front view of an aircraft showing the inlet duct and gas generating means.

Referring first to Figure 1, there is shown a VTOL aircraft generally indicated at 10. To provide the desired motion, air is drawn into the aircraft and expelled in a suitable direction in large quantities by means of an air duct 11 having a forwardly directed inlet 12 and a downwardly and rearwardly directed outlet generally indicated at 13. Thus, the air duct passes through the fuselage, preferably in a generally horizontal direction.

Load-carrying means is provided on the uppermost part of the aircraft at 14 which may be directly above the inlet duct or can extend into partitions between the inlet duct, as shown at 15. Thus, the normal lack of load-carrying surfaces provided in fan-type aircraft, wherein air is taken from above and expelled below, is avoided in the instant invention, which leaves a completely free upper surface on the fuselage for carrying passengers or suitable freight.

In order to provide motive power by the fan in all attitudes of flight, a single fan at 16 may be provided to lie substantially in a duct at the outlet plane of the air duct and move a large quantity of air to create a fluid flow through the duct. While a single fan only can be seen in Figure 1, it will be appreciated that a plurality of fans may be used, in which case, they would preferably lie directly behind one another and would appear as shown in Figure 2. Thus, the air entering inlet 12 passes directly through the duct 11 and is pumped in a blast of fluid flow in a downward and rearward direction by fan 16. It is to be noted that the instant aircraft is designed to provide high forward speed, and to this end, the fan is tilted or inclined at an angle to the vertical, as clearly shown in Figure 1. Obviously, any angle of inclination may be employed depending on the flight characteristics desired of the aircraft.

While the fan may be mounted on a tiltable axis in order to change the direction of the exhaust, and thus the direction of flight, I prefer to use control means, such as vanes 17 mounted on the fuselage in the exit plane downstream of the fan in the fan discharge. Thus, movement of the vanes 17 controls the direction of the exhaust for any attitude of flight.

Suitable supporting means 18, which are shown as skids, but may take any suitable form, are employed to support the aircraft on the ground.

It is to be noted that the instant aircraft preferably utilizes no wings, as can be seen in Figure 2, although wings may be employed to impart additional lift, if desired. However, the arrangement shown does not require the use of wings. Consequently, the aircraft is extremely maneuverable without being weighty, and is not handicapped with the extra bulk normally encountered in the use of wings.

In order to drive the fan 16 and provide for the movement of large quantities of air, I provide gas generating means 19 which may be conveniently in the form of small jet engines, as shown in Figure 1. It is to be understood that any suitable gas generating means may be used in the combination, but the jet engines represent a preferred form. As such, a single jet engine or plurality of jet engines may be provided, preferably arranged in a longitudinal direction in the inlet to occupy part of the inlet of the air duct 11. Since gas generating means 19 represent any conventional jet engine, it is not necessary to describe the internals of the engine since they are clearly apparent in Figure 1.

Surrounding the fan, about the periphery thereof, is a scroll or manifold 20 which collects all of the exhaust from the gas generating means 19. It is to be noted that the manifold 20 may completely surround the fan periphery or may partially surround it, as desired. The driving means for the fan consist of tip-mounted turbine blades 21 which are arranged about the periphery of the fan or fans in the path of the discharge from manifold 20. Thus, the fan or fans 16 can be driven by the impingement of the exhaust gas on turbine blades 21 by either partial or complete turbine admission. In addition, the exhaust gas leaving the blades 21 passes out the common exit to contribute some thrust for the propulsion of the aircraft, although most of the exhaust gas energy is transferred to the fan.

When a single fan is employed, as may be visualized in Figure 1, the axis of rotation of the fan should pass substantially through the center of gravity of the aircraft for stability. If plural fans are used, as may also be visualized in Figure 1, it is not necessary that the axis pass through the center of gravity. In either condition, the thrust axis of the aircraft coincides with the resultant of the weight and of the total drag of the vehicle.

In order to provide control to the aircraft, a reaction control 22 is provided, preferably at the rear of the fuselage aft of the fan. This consists of a series of banks of shutters 23 that may be actuated selectively to direct a control jet in any desired direction or directions. Obviously, other means of directing a jet can be employed and the shutters are merely illustrative. The fluid supplied to the reaction control 22 in the present instance is exhaust gas directed to the reaction control through a conduit 24, which is connected to manifold 20.

In operation, when vertical lift is desired, the air entering inlet 12 is ducted and pumped by fan 16 directly to provide a fluid flow downwardly by control vanes 17 in large quantities. The reaction control 22 provides the necessary stability. In forward flight, the vanes 17 direct the air rearwardly or provide a larger rearwardly directed component so that the maximum thrust propels the aircraft in a horizontal direction at economical fuel consumption rates. Control of the vanes 17 in any intermediate position provides the directions of flight between vertical and horizontal, as is apparent in Figure 1.

Thus, the present invention provides for all directions of flight by the use of fan air only, which is capable of moving large masses of air, and the combination disclosed permits stable operation during vertical take-off, hovering, and high forward flight speeds.

While a particular embodiment of the invention has been illustrated and described, it will be obvious to those skilled in the art that various changes and modifications may be made without departing from the invention, and it is intended to cover in the appended claims, all such changes and modifications within the true scope of the invention.

I claim:

1. A VTOL aircraft comprising, a load-carrying fuselage, an air duct extending longitudinally through the fuselage having a forwardly directed inlet and a downwardly and rearwardly directed outlet, at least one fan disposed in the outlet duct at an angle to the vertical to produce a fluid flow through the duct and provide lift and propulsion, turbine blades mounted on the fan periphery to drive the fan thereby, a gas collecting manifold adjacent the turbine and discharging to the turbine blades, gas generating means disposed in and occupying part of the air duct inlet and discharging into the manifold, and a reaction control means at the rear of the fuselage connected to the manifold.

2. Apparatus as described in claim 1 having directional control vanes mounted in the fuselage downstream of the fan and in the discharge thereof.

3. A VTOL aircraft comprising, a load-carrying fuselage, an air duct extending longitudinally through the fuselage having a forwardly directed inlet and a single downwardly and rearwardly directed outlet, a fan disposed substantially in the duct in the plane of the outlet to produce a fluid flow through the duct and provide lift and propulsion, turbine blades mounted on the fan periphery to drive the fan thereby, a gas collecting manifold around the periphery of the fan and discharging to the turbine blades, at least one jet engine gas generator horizontally disposed in and occupying part of the duct inlet and discharging into the manifold, and a reaction control at the rear of the fuselage connected to the manifold.

4. Apparatus as described in claim 3 having directional control vanes mounted in the fuselage downstream of the fan and in the discharge thereof.

5. A VTOL aircraft comprising, a load-carrying fuselage, an air duct extending longitudinally through the fuselage having a forwardly directed inlet and a single downwardly and rearwardly directed outlet, a single fan disposed in the duct substantially in the plane of the outlet and having its axis of rotation passing substantially through the center of gravity of the aircraft to produce a fluid flow through the duct and provide lift and propulsion, turbine blades mounted on the fan periphery to drive the fan thereby, a gas collecting manifold completely surrounding the fan and discharging to the turbine blades, a plurality of jet engine gas generators horizontally disposed in and occupying part of the duct inlet and discharging into the manifold, a reaction control aft of the fan and connected to the manifold, and directional control vanes downstream of the fan in the discharge thereof to control the direction of the fan discharge.

References Cited in the file of this patent

UNITED STATES PATENTS

| 2,472,839 | Kramer | Jan. 14, 1949 |
| 2,828,929 | Lippisch | Apr. 1, 1958 |
| 2,875,578 | Kadosch | Mar. 3, 1959 |
| 2,879,014 | Smith | Mar. 3, 1959 |

FOREIGN PATENTS

| 1,068,404 | France | Feb. 3, 1954 |